United States Patent
Asang

(10) Patent No.: US 12,441,254 B2
(45) Date of Patent: Oct. 14, 2025

(54) HOLDING DEVICE FOR HOLDING AT LEAST ONE DRIVER ASSIST SENSOR UNIT, AND ARRANGEMENT OF A HOLDING DEVICE

(71) Applicant: Bayerische Motoren Werke Aktiengesellschaft, Munich (DE)

(72) Inventor: Peter Asang, Eurasburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 13 days.

(21) Appl. No.: 17/284,265

(22) PCT Filed: Sep. 23, 2019

(86) PCT No.: PCT/EP2019/075501
§ 371 (c)(1),
(2) Date: Apr. 9, 2021

(87) PCT Pub. No.: WO2020/074244
PCT Pub. Date: Apr. 16, 2020

(65) Prior Publication Data
US 2021/0370845 A1    Dec. 2, 2021

(30) Foreign Application Priority Data
Oct. 10, 2018    (DE) ............... 10 2018 125 065.7

(51) Int. Cl.
*B60R 1/24*    (2022.01)
*B60R 11/04*    (2006.01)
(Continued)

(52) U.S. Cl.
CPC ............ *B60R 11/04* (2013.01); *H04N 23/51* (2023.01); *H04N 23/57* (2023.01); *B60R 2011/0026* (2013.01)

(58) Field of Classification Search
CPC ........... B60R 11/04; B60R 2011/0026; H04N 5/2252; H04N 5/2257
See application file for complete search history.

(56) References Cited

U.S. PATENT DOCUMENTS

| | | | |
|---|---|---|---|
| 2004/0208497 A1* | 10/2004 | Seger | H04N 13/239 |
| | | | 396/326 |
| 2007/0030573 A1* | 2/2007 | Batchko | B33Y 50/02 |
| | | | 359/665 |

(Continued)

FOREIGN PATENT DOCUMENTS

| | | |
|---|---|---|
| CN | 101395034 A | 3/2009 |
| CN | 103697179 A | 4/2014 |

(Continued)

OTHER PUBLICATIONS

PCT/EP2019/075501, International Search Report dated Nov. 22, 2019 (Two (2) pages).

(Continued)

*Primary Examiner* — Patrick E Demosky
(74) *Attorney, Agent, or Firm* — Crowell & Moring LLP

(57) ABSTRACT

A holding device is configured to hold at least one driver assist sensor unit in the vehicle interior of a motor vehicle relative to a front window. The holding device has a front window holder fastening the holding device to the inner side of the front window, and a baffle that, together with part of the front window, delimits an inner volume. The baffle projects beyond the front window holder by at least one side region and has, at least at this side region, a sealing lip for sealing the inner volume of the baffle with respect to the front window.

9 Claims, 1 Drawing Sheet

(51) Int. Cl.
*H04N 23/51* (2023.01)
*H04N 23/57* (2023.01)
*B60R 11/00* (2006.01)

(56) References Cited

U.S. PATENT DOCUMENTS

| | | | |
|---|---|---|---|
| 2009/0295181 A1* | 12/2009 | Lawlor | B60R 11/04 296/1.11 |
| 2012/0310519 A1* | 12/2012 | Lawlor | B60R 1/12 248/205.3 |
| 2014/0226012 A1* | 8/2014 | Achenbach | B60R 11/04 348/148 |
| 2016/0227079 A1* | 8/2016 | Oh | B60R 11/04 |
| 2018/0152609 A1* | 5/2018 | Wang | H04N 7/18 |
| 2018/0284398 A1 | 10/2018 | Furutake et al. | |

FOREIGN PATENT DOCUMENTS

| | | | | |
|---|---|---|---|---|
| CN | 104080654 A | | 10/2014 | |
| CN | 105491350 A | * | 4/2016 | B60R 11/04 |
| CN | 205305009 U | | 6/2016 | |
| CN | 106796648 A | | 5/2017 | |
| DE | 102 37 607 B4 | | 3/2004 | |
| DE | 10 2004 057 322 A1 | | 6/2006 | |
| DE | 10 2009 027 372 A1 | | 1/2011 | |
| DE | 10 2014 224 860 A1 | | 6/2016 | |
| DE | 10 2017 006 791 A1 | | 1/2018 | |
| EP | 2 246 219 B1 | | 11/2010 | |
| EP | 2 539 180 B1 | | 1/2013 | |
| WO | WO 2006/063827 A1 | | 6/2006 | |
| WO | WO-2013123161 A1 | * | 8/2013 | B60R 11/04 |
| WO | WO 2014/052355 A1 | | 4/2014 | |
| WO | WO 2015/186002 A2 | | 12/2015 | |
| WO | WO 2017/036790 A1 | | 3/2017 | |

OTHER PUBLICATIONS

German Search Report issued in German application No. 10 2018 125 065.7 dated Jul. 19, 2019, with Statement of Relevancy (Seven (7) pages).

Chinese Office Action issued in Chinese application No. 201980051408.2 dated May 5, 2023, with English translation (Seventeen (17) pages).

* cited by examiner

HOLDING DEVICE FOR HOLDING AT LEAST ONE DRIVER ASSIST SENSOR UNIT, AND ARRANGEMENT OF A HOLDING DEVICE

BACKGROUND AND SUMMARY OF THE INVENTION

The invention relates to a holding device for holding at least one driver assist sensor unit in the vehicle interior of a motor vehicle, and in particular to an arrangement of the holding device.

Motor vehicles, for example passenger vehicles, frequently have a driver assist sensor unit, which is in particular at least one camera unit comprising a camera sensor. The driver assist sensor unit can provide items of image information to a driver assist system, for example. In order that such a camera unit, which is in particular supposed to record the region or traffic located in front of the motor vehicle, can be advantageously operated, it is arranged as high and as centrally as possible, i.e. in general in the vicinity of a vehicle rearview mirror, in particular behind the windshield or front window, in the vehicle interior.

Thus, DE 102 37 607 B4 discloses a camera arrangement for motor vehicles having a camera which is arranged in the vehicle interior behind the front window. In this case, the camera arrangement has a holder fastened on the inside of the front window for the camera, which simultaneously forms a cover cap that encloses the space between front window and camera objective in a light-tight and dust-tight manner. A fastening element, in particular a fastening ring, is clicked onto the front window here, so that the holder designed as a cover cap is pressed against the front window via a spring between the fastening element and the holder.

Furthermore, EP 2 246 219 B1 discloses a holder for a light-sensitive sensor behind a transparent pane, which delimits an interior from an exterior, wherein the holder closes off a region of an inner side of the pane with a nearly closed housing. In this case, the housing wall is substantially opposite to the pane on the inside and is covered by a moisture-absorbing substance, wherein the substance is formed by flocking the housing wall with a moisture-absorbing and light-absorbing material and the housing wall has ventilation slots in the region of the lining with the internal substance.

Finally, EP 2 539 180 B1 discloses a holding device for holding an interior mirror module on a windshield of a motor vehicle, having a baseplate fastened on the windshield, and having at least one housing to be held on the baseplate, in which a camera is at least regionally receivable, wherein the interior mirror module is to be held on the baseplate via a holding part. In this case, the holding part is held directly on the baseplate while bypassing the at least one housing.

In addition, holding devices for holding a camera are known, in which a lens shade is inserted on the reverse side in a front window holder, that is to say the front window holder fastened on the inside of the front window completely receives a lens shade.

It is the object of the present invention to provide a holding device for holding at least one driver assist sensor unit and an arrangement of a holding device, by means of which a field of view of the driver assist sensor unit arranged on the front window may be made particularly large, with particularly compact dimensions of the holding device at the same time.

This object is achieved according to the invention by a holding device for holding at least one driver assist sensor unit having the features disclosed herein. Further aspects, features and embodiments of the invention are the subject matter described herein.

A holding device according to the invention for holding at least one driver assist sensor unit in the vehicle interior of a motor vehicle in relation to a front window has a front window holder for fastening the holding device on the inside of the front window. Furthermore, the holding device has a lens shade, which delimits an inner volume with a part of the front window. In this case, the front window holder is held, in particular fixed in place, on the front window, which is a windshield in particular, and is used to hold further components of the holding device, for example the lens shade, in relation to the window. The inner volume is delimited in such a way that direct light incidence from the vehicle interior is not possible, in particular due to the lens shade, so that the at least one driver assist sensor unit does not receive or absorb any scattered light from the interior from the inside of the motor vehicle or its vehicle interior through the front window. The driver assist sensor unit can comprise at least one driver assist sensor, which is designed in particular as an environmental record sensor and is used to record an environment of the motor vehicle. In particular, the driver assist sensor is designed as an optical sensor. In this case, the recording range of the optical sensor can comprise wavelengths of the visible and the nonvisible spectrum, wherein the recording range can also be dependent on a transparency range of the front window. The driver assist sensor unit is in particular a camera unit, preferably a so-called KAFAS camera. KAFAS is an abbreviation for "Kamera für Fahrerassistenzsystem [camera for driver assist system]". The driver assist sensor unit can, for example, comprise a lidar sensor additionally or alternatively to the mentioned camera sensor, for example. The driver assist sensor unit can be used in particular to operate a driver assist system of the motor vehicle, which is designed in particular as a passenger vehicle.

To now be able to make the holding device particularly compact, it is provided according to the invention that at least one lateral region of the lens shade protrudes beyond the front window holder. That is to say, in an installed state, on which the lens shade is held on the front window holder, the footprint of the front window holder and the footprint of the lens shade are arranged in relation to one another in such a way that the footprint of the lens shade is not completely enclosed by the footprint of the front window holder. At least a respective lateral edge of the footprint of the lens shade coincides with a lateral edge of the footprint of the front window holder. The respective footprint can be understood here as the area which the largest surface with respect to area of the respective component has, i.e. of the front window holder or the lens shade. Since the footprint of the front window holder and the footprint of the lens shade do not have to extend in parallel, but rather can also occur at an angle in relation to one another in the installed state, the protrusion of the lateral region of the lens shade in at least one lateral region with the front window holder can also be understood to mean that at least in one spatial direction a lateral region of the lens shade is extended at least far enough along the spatial direction, starting from the inner volume, for example, that the front window holder extends at most as far as the lens shade in this spatial direction.

Furthermore, the lens shade according to the invention of the holding device has a sealing lip on at least this lateral region for sealing off the inner volume of the lens shade in relation to the front window. In other words, the sealing lip, which functions in particular as a seal, touches the front window or windshield of the motor vehicle in an installed state in such a way that a particle exchange, in particular of dust particles, for example, is kept particularly low between the inner volume and the vehicle interior. In an installed state, the sealing lip can be pressed against the front window to seal off the inner volume here.

Due to the sealing lip according to the invention of the lens shade, it can be dimensioned so that, for example, a particularly large opening region or opening angle for a field of vision of the driver assist sensor unit can be implemented. Due to the sealing lip, in the case of a large opening angle and/or in particular also if multiple driver assist sensor units use the same lens shade according to the invention, irregularities or manufacturing tolerances of the front window can be compensated for in such a way that the inner volume can be kept dust free particularly advantageously. The sealing lip can be sufficient on the at least one lateral region, since on the other lateral regions of the lens shade, it is enclosed in particular by the front window holder, which can be installed in particular on the window in such a way that it does not let any dust through between front window and front window holder.

Due to the protrusion beyond or flush termination of the lens shade with the front window holder, which is designed to fix the lens shade in relation to the front window, installation space is saved in a particularly advantageous manner so that, for example as known from the prior art, the lens shade does not have to be covered completely on the outer circumference by the front window holder. A circumferential front window holder is thus prevented from obstructing a view of the driver, for example of a traffic signal, in the viewing direction of the holding device. By omitting the circumferential front window holder, the lens shade according to the invention is thus in particular only still fastened, for example, on three sides on the front window holder, which is particularly advantageous for a field of vision of the driver. In addition to an improved view for the driver, as a further advantage, a decrease or reduction of the installation space of the holding device results, for example, whereby costs can also be saved, for example, due to a low material consumption. In addition, a resulting reduction of a tinting on the window or a vision protection coating of the front window can be less, which also reduces the cost, for example. In addition, for example, a resulting casing in the form of an interior mirror cap or rearview mirror cap can also be smaller. The mentioned advantages are accompanied here by a particularly large recording range of the at least one driver assist sensor unit.

In one advantageous embodiment of the invention, the driver assist sensor unit is designed as a camera unit. In other words, the driver assist sensor is designed as a camera sensor of a camera unit, which is designed in particular to record images in the visible spectrum. In this case, the camera sensor can be designed, for example as a CCD sensor, which also records, for example, a part of the infrared spectrum in addition to the visible spectrum depending on the design. In this case, a recording range can be adapted, for example, using at least one filter to the desired recording range. Due to the design of the driver assist sensor unit as a camera unit, for example, the driver assist system of the motor vehicle can be operated particularly advantageously.

In one advantageous embodiment of the invention, the lens shade is held by means of at least one plug connection and/or at least one screw connection and/or at least one clip connection on the front window holder. Any combination of the mentioned types of connection can be embodied for holding or connecting the lens shade to the front window holder. In addition, further types of connection, for example also adhesive bonding or hook-and-loop connections, can be implemented. In this case, the type of connection is dependent in particular on the intended use of the at least one driver assist sensor unit. If it is supposed to be used, for example, for autonomous driving of degree 4 or 5, country-specific specifications of the legislators are also to be observed in particular, for example, so that a particularly secure screw connection has to be implemented, for example. Thus, for example, due to the holding of the lens shade on the front window holder by means of a screw connection, it can be particularly solid, so that, for example, even in case of a large momentum acting on the vehicle, for example due to an accident, the driver assist sensor unit can be held particularly securely on the front window.

In a further advantageous embodiment of the invention, the holding device is designed for holding three camera units or driver assist sensor units, wherein the optical axes of the three camera units or driver assist sensor units are located at least partially in the inner volume. In other words, the inner volume is shaped in such a way that in an installed state, the cameras are held in such a way that the respective fields of vision thereof lead through the inner volume, in particular the same inner volume. At least a part of the optical unit of the respective camera unit, in particular in the form, for example, of a lens, is thus arranged in such a way that the light beams incident on this part of the respective optical unit, in particular coming from an environment of the motor vehicle, each pass or traverse the same inner volume divided jointly by the camera units on the path to the camera unit. In this case, the respective optical unit of the respective camera unit can have an individual, for example, focal length in each case, which differs from the two other optical units of the two other camera units, so that, for example, a close range and a long range and a moderate range located in between can be recorded particularly advantageously by the camera units. Alternatively or additionally, each of the three camera units or driver assist sensor units can have a sensor which records, for example, another range of the optical spectrum. Because the optical axes are each at least partially located in the inner volume, the recording range or the opening angle can be selected to be particularly large for each one of the camera units and at the same time the installation space of the holding device can be kept particularly small.

In a further advantageous embodiment of the invention, the sealing lip is designed as a two-component sealing lip. In other words, the sealing lip is formed from at least one material which can have different material properties. Thus, for example, the hardness in one subregion of the sealing lip can be different than in a further subregion of the sealing lip. Thus, for example, the sealing lip can be softer on a side facing away from the inner volume, whereby it can cling particularly well to the front window, and can be made harder toward the driver assist sensor unit, so that it can hold the lens shade in a particularly dimensionally stable manner, for example.

In a further advantageous embodiment of the invention, the lens shade comprises a holding element, by which the driver assist sensor unit is held in relation to the front window. In other words, the at least one driver assist sensor unit is fastened in the installed state on the lens shade in such a way that it is translationally and rotationally fixed in relation to the lens shade and in particular is held so that further fastening, for example on the front window holder, is not necessary. The driver assist sensor unit, in particular camera, can thus be held particularly advantageously in relation to the front window by the holding device, whereby a resulting installation effort and thus costs can be particularly low. In addition, a further holding element, for example, on the front window holder, can be omitted, whereby the holding device can be made particularly compact.

In a further advantageous embodiment of the invention, the driver assist sensor unit is held by a clip connection and/or a spring device of the holding element. The driver assist sensor unit, in particular again depending on a requirement of the driver assist sensor unit for an autonomous driving level or an autonomous driving degree and/or on the requirement for the country-specific legislation, can be held on the lens shade by the clip connection and/or the spring device. In addition or additionally or alternatively, for example, screwing the driver assist sensor unit on the lens shade is implementable, in particular in consideration of country-specific legislation. In this case, for example, the clip connection and/or the holding means of the spring device and/or, for example, screwing on is also advantageously used, as in the case of a large momentum acting on the motor vehicle, for securely holding the driver assist sensor unit in relation to the front window.

In a further advantageous embodiment of the invention, the lens shade is integrally formed with the sealing lip, that is to say the lens shade and the sealing lip are formed jointly as one component, whereby a two-component sealing lip may be implemented particularly advantageously, for example. Furthermore, the installation space requirement can thus be kept particularly small.

A further aspect of the invention relates to an arrangement of a holding device according to the invention in the vehicle interior of a motor vehicle relative to a front window. In order that a field of vision of the driver of the motor vehicle can be made particularly large, with a particularly small installation space requirement at the same time, it is provided according to the invention that a vision protection coating or a tinting of the front window in the region of the holding device is only provided on the front window holder, that is to say in the region at which the front window holder has contact with the front window, and in addition the lateral region, i.e. the region of the lens shade which in particular has the sealing lip, i.e. the region of the front window over which the lateral region protrudes, is free of coating. This has the advantage, on the one hand, that the driver of the vehicle cannot have a view of a traffic light blocked, for example, because of the non-tinted region, which is located, viewed in the forward travel direction of the vehicle, in front of the lens shade on the front window. In addition, due to a particularly small required region of the vision protection coating, this can be saved and thus costs can be reduced. Furthermore, an impression of the motor vehicle achieved in particular from the outside is thus particularly high-quality.

Advantages of the arrangement of the holding device are to be considered advantages of the holding device itself and vice versa.

In one advantageous embodiment of the invention, a mirror cap of a rearview mirror, which is used as a casing of a rearview mirror holder, is designed as a cover of the holding device. In other words, in particular in the case of a rearview mirror which is held on the front window by, for example, a rearview mirror holder in the immediate vicinity of the holding device, the mirror cover cap of which is designed so that it is used simultaneously for the facing of the rearview mirror holding element and the facing of the holding device. It is thus possible to keep the number of components particularly low. In addition, the advantage results that installation can be carried out particularly easily, since only one component is required as the cover for both the rearview mirror and also the holding device, which can additionally in particular also enable a component size reduction.

Further features of the invention result from the claims, the figures, and the description of the figures. The features and feature combinations mentioned above in the description and the features and feature combinations mentioned hereinafter in the description of the figures and/or shown solely in the figures are usable not only in the respective specified combination but also in other combinations or alone.

The invention will now be explained in greater detail on the basis of a preferred exemplary embodiment and with reference to the drawings. In the figures:

DETAILED DESCRIPTION OF THE DRAWINGS

Figure 1:
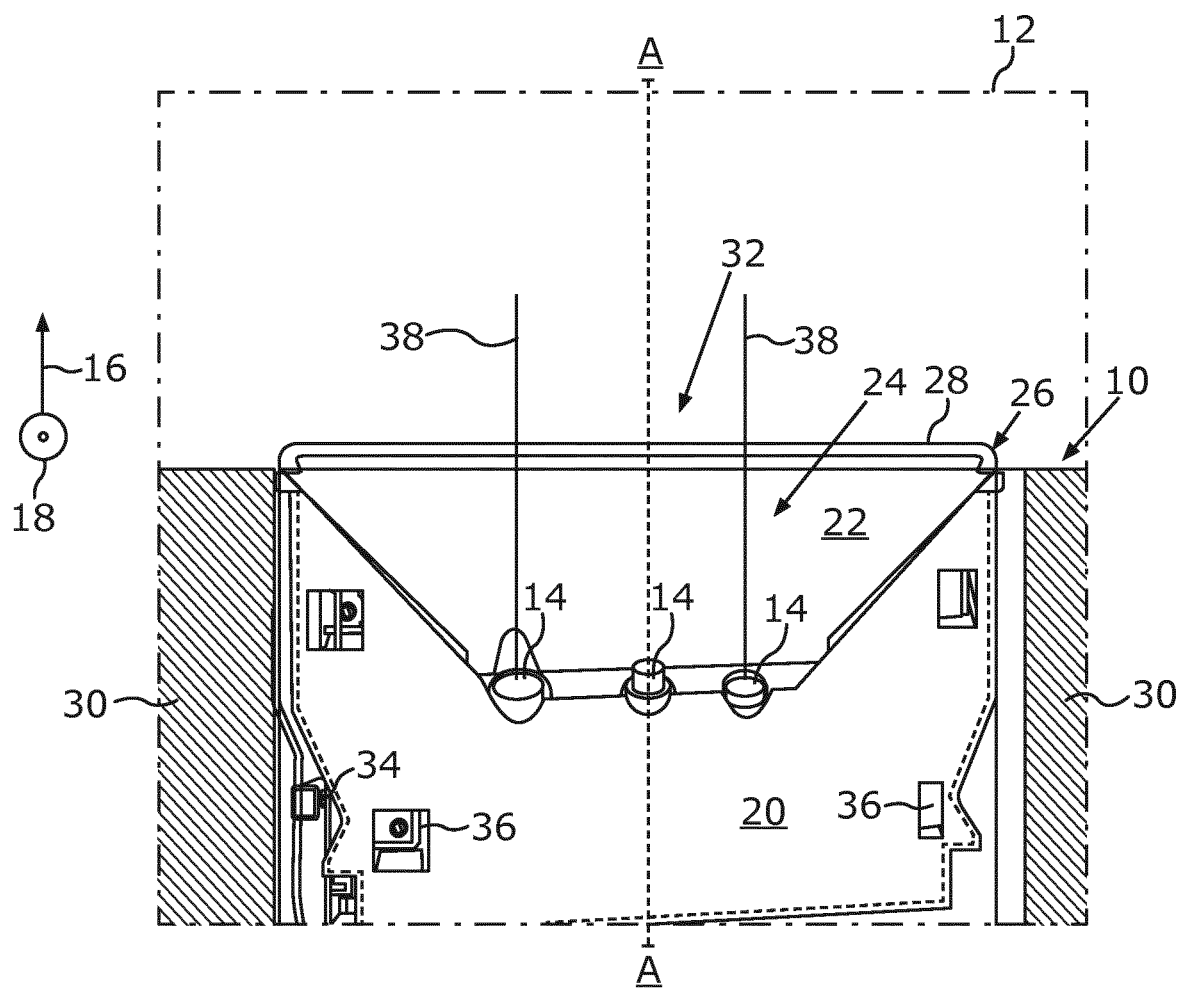
FIG. 1 shows a schematic top view with viewing direction from a vehicle vertical direction of a front window of a motor vehicle, on which a holding device for holding at least one driver assist sensor unit is arranged.

FIG. 1 shows a holding device 10 on a front window of a motor vehicle, designed in particular as a passenger vehicle. The holding device 10 is used for holding at least one driver assist sensor unit, designed in the exemplary embodiment as a camera unit 14, in relation to the front window 12. The orientation of FIG. 1 is such that the vehicle forward travel direction 16 is located toward the upper image edge and the plane of the image is oriented perpendicular to the vehicle vertical direction 18. The holding device 10 has a front window holder 20 for fastening the holding device 10 on the inside of the front window 12. Furthermore, the holding device 10 comprises a lens shade 22, which delimits an inner volume 24 with a part of the front window 12.

To be able to make the installation space requirement of the holding device 10 particularly small, the lens shade 22 protrudes beyond the front window holder 20 with at least one lateral region 26. In addition, a sealing lip 28 for sealing off the inner volume 24 of the lens shade 22 in relation to the front window 12 is arranged on this at least one lateral region 26, in particular to be able to make a field of vision of the at least one camera unit 14 particularly large. The respective field of vision of the respective camera unit 14 is primarily determined by the size or, in FIG. 1, the width of the lens shade 22. The larger this resulting field of vision or opening angle, the longer it extends over a or the part of the front window 12. Therefore, for example, manufacturing-related irregularities of the front window 12, which can also be referred to as the windshield, can be compensated for particularly advantageously by the sealing lip 28, so that the inner volume 24 can be sealed off in a particularly dust-tight manner in particular. The sealing lip 28 is not required in the lateral regions of the lens shade 22 different from the lateral region 26, since the front window holder 20 already closes off the inner volume 24 in a dust-tight manner there due to a fixed connection to the front window 12.

Due to the sealing lip 28, the front window holder 20 does not have to be designed in such a way that the entire lens shade 22 is enclosed thereby, in particular perpendicularly relative to the viewing direction of FIG. 1, whereby the holding device 10 can be made particularly space-saving. The advantage thus results, for example, for a driver of the motor vehicle that a view of a traffic signal, for example, is not interfered with or impaired, or at less so, by the holding device 10.

The camera unit 14 is advantageously designed as a so-called KAFAS camera, which means that the camera unit 14 can provide items of image information to a driver assist system of the motor vehicle.

FIG. 1 furthermore shows an arrangement of a holding device 10 in a vehicle interior of the motor vehicle in relation to the front window 12. The arrangement is designed here in such a way that a vision protection coating 30 in the front window 12 in the region of the holding device 10 is only provided on the front window holder 20 and the region 32 of the front window 12 over which the lateral region 26 protrudes is free of coating. The advantage thus results that the resulting field of vision for the driver of the motor vehicle can be particularly large, since the vision protection coating 30, which can also be referred to as a so-called tinting, can be embodied to be particularly narrow, in particular on an edge of the front window 12. For comprehensibility of FIG. 1, the vision protection coating 30 is omitted in a region of FIG. 1 which shows the front window holder 20.

The lens shade 22 is advantageously held on the front window holder 20 by means of at least one plug connection 34 and/or at least one screw connection 36 and/or at least one clip connection. The selection of the correct fastening means for connecting the lens shade 22 to the front window holder 20 takes place in particular based on the requirement which is placed on the at least one camera unit 14. For example, if the camera unit 14 is designed to supply a driver assist system with items of image information, so that it can carry out independent driving maneuvers with a particularly high degree of automation, the camera unit 14 has to be held on the front window 12 particularly securely and fixed, whereby the screw connection 36 is advisable, for example. In addition, for example, legislators can also prescribe corresponding fasteners. If these legal regulations do not exist, the selection of the connecting means can take place in such a way that, for example, the installation effort and/or the costs can be kept particularly low.

In a further advantageous embodiment of the invention, the holding device 10 is designed for holding three camera units 14, wherein the optical axes 38 of the three camera units 14 are at least partially located in the inner volume 24. A respective lens shade for the respective camera unit 14 can thus be omitted, for example, whereby installation space can particularly advantageously be saved with a particularly large field of vision of the respective camera unit 14 at the same time. That is to say, an opening cone defined by an opening angle, which characterizes the field of vision of the respective camera unit 14, does not intersect the lens shade 22 with its respective lateral surface in the region of the inner volume 24. The exception could be that an image region is thus cut off which cannot provide relevant items of information for the driver assist system, for example an engine hood of the motor vehicle.

Figure 2:
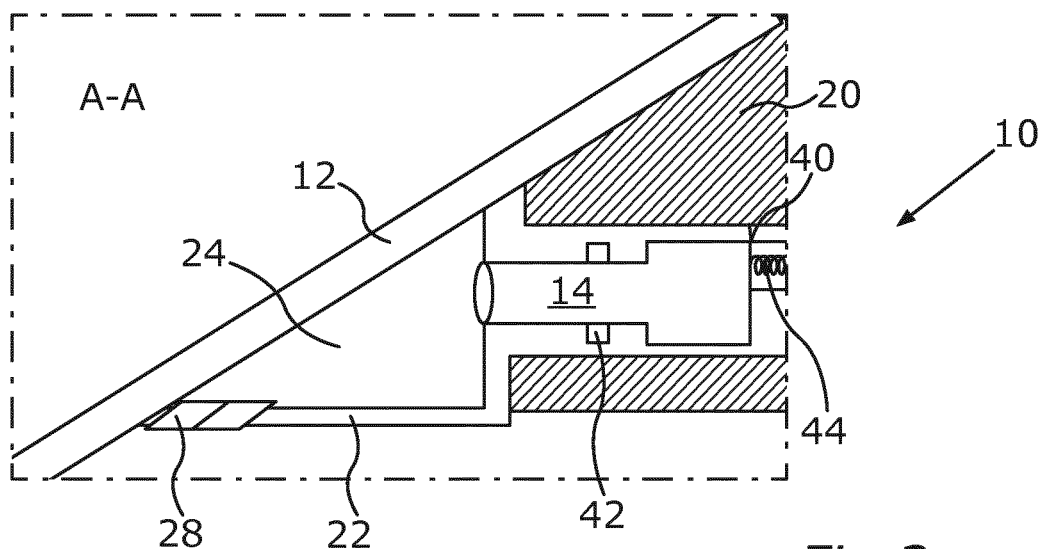
FIG. 2 shows a schematic sectional view through the holding device of FIG. 1.

FIG. 2 shows the holding device 10 along a plane of section A-A. It can be seen here that the sealing lip 28 is designed as a two-component sealing lip, i.e. in particular the sealing lip 28 has two different degrees of hardness, so that it is made particularly soft in a first region, which touches the front window 12, in order to be able to cling particularly advantageously and thus in a dust-tight manner to the front window 12, while in contrast the second portion is somewhat harder, for example to be able to support the lens shade 22 in its shape.

Furthermore, the lens shade 22 is advantageously integrally formed with the sealing lip 28, whereby, for example, the installation effort can be kept particularly low. In this case, the integral formation can be carried out, for example, by means of an additive manufacturing method or by, for example, an injection-molding technology. The lens shade 22 advantageously comprises a holding element 40, by which the camera unit 14 is held relative to the front window 12.

The holding element 40 can advantageously, for example, have a clip connection 42 and/or a spring device 44, by which the camera unit 14 can be held particularly advantageously on the lens shade 22, so that it is correspondingly held securely, for example, again depending on the required autonomous or implemented autonomous driving level of the motor vehicle. In addition, other fastening options are implementable, for example screwing on. Due to the fastening or the holding of the camera unit 14 on the lens shade 22, an additional holder or an additional holding element for the camera unit 14 on the front window holder 20 can be omitted, whereby the number of components and thus, for example, a probability of failure can be kept particularly low.

Finally, a mirror cap of a rearview mirror, which is used as a casing of a rearview mirror holder, can be designed as a cover of the holding device 10.

Extension of the front window holder 20 around the lens shade 22 can be omitted due to the holding device 10 shown, so that the lens shade 22 only has to be fastened on three sides on the front window holder 20, for example, whereby, for example, the view of the driver or the field of vision of the driver can be enlarged. This results in an improved view of traffic signals. In addition, due to the decrease in size of the installation space, a reduction of the costs can also take place, since material can be saved. Moreover, the motor vehicle appears higher-quality due to the reduction of the vision protection coating 30 or the tinting on the front window. A reduction in size of the mirror caps is possible at the same time.

LIST OF REFERENCE NUMERALS

10 holding device
12 front window
14 camera unit
16 forward travel direction
18 vehicle vertical direction
20 front window holder
22 lens shade
24 inner volume
26 lateral region
28 sealing lip
30 vision protection coating
32 region
34 plug connection
36 screw connection
38 optical axis
40 holding element
42 clip connection
44 spring device

What is claimed is:
1. A holding device, comprising:
a front window holder, configured to fasten a lens shade to the inside of a front window of a motor vehicle in a dust-tight manner, such that, via contact with the front window, and together with the front window and a forward lateral edge of the lens shade, the front window holder delineates an inner volume separating a driver assist sensor unit from the front window; and the lens shade, wherein the lens shade includes:
a holding element that extends the lens shade into the front window holder so as to hold the driver assist sensor unit therein, wherein the driver assist sensor unit is not held within the holding device by the front window holder except via the holding element of the lens shade, and the forward lateral edge, wherein the forward lateral edge protrudes beyond the front window holder and includes an injection-molded sealing lip that seals the inner volume at the forward lateral edge in a dust-tight manner.

2. The holding device according to claim 1, wherein the driver assist sensor unit is a camera unit.

3. The holding device according to claim 1, wherein the lens shade is held on the front window holder by at least one plug connection and/or at least one screw connection and/or at least one clip connection.

4. The holding device according to claim 1, wherein the driver assist sensor unit includes three camera units whose optical axes are located at least partially in the inner volume.

5. The holding device according to claim 1, wherein the sealing lip is a two-component sealing lip.

6. The holding device according to claim 1, wherein the driver assist sensor unit is held by a clip connection and/or a spring device of the holding element.

7. The holding device according to claim 1, wherein the lens shade is integrally formed with the sealing lip.

8. A system comprising:
a front window of a vehicle, the front window including a vision protection coating; and
a holding device, comprising:
a front window holder, configured to fasten a lens shade to the inside of a front window of a motor vehicle in a dust-tight manner, such that, via contact with the front window, and together with the front window and a forward lateral edge of the lens shade, the front window holder delineates an inner volume separating a driver assist sensor unit from the front window, and the lens shade, wherein the lens shade includes:
a holding element that extends the lens shade into the front window holder so as to hold the driver assist sensor unit therein, wherein the driver assist sensor unit is not held within the holding device by the front window holder except via the holding element of the lens shade, and the forward lateral edge, wherein the forward lateral edge protrudes beyond the front window holder and includes an injection-molded sealing lip that seals the inner volume at the forward lateral edge in a dust-tight manner, wherein the vision protection coating is provided on the front window exclusive of the region of the front window over which the forward lateral edge protrudes.

9. The arrangement according to claim 8, wherein a mirror cap of a rearview mirror configured as a casing of a rearview mirror holder, is further configured as a cover of the holding device.

* * * * *